No. 743,289. PATENTED NOV. 3, 1903.
J. JACKSON.
SPRING WHEEL FOR VEHICLES.
APPLICATION FILED DEC. 8, 1902.
NO MODEL. 3 SHEETS—SHEET 1.
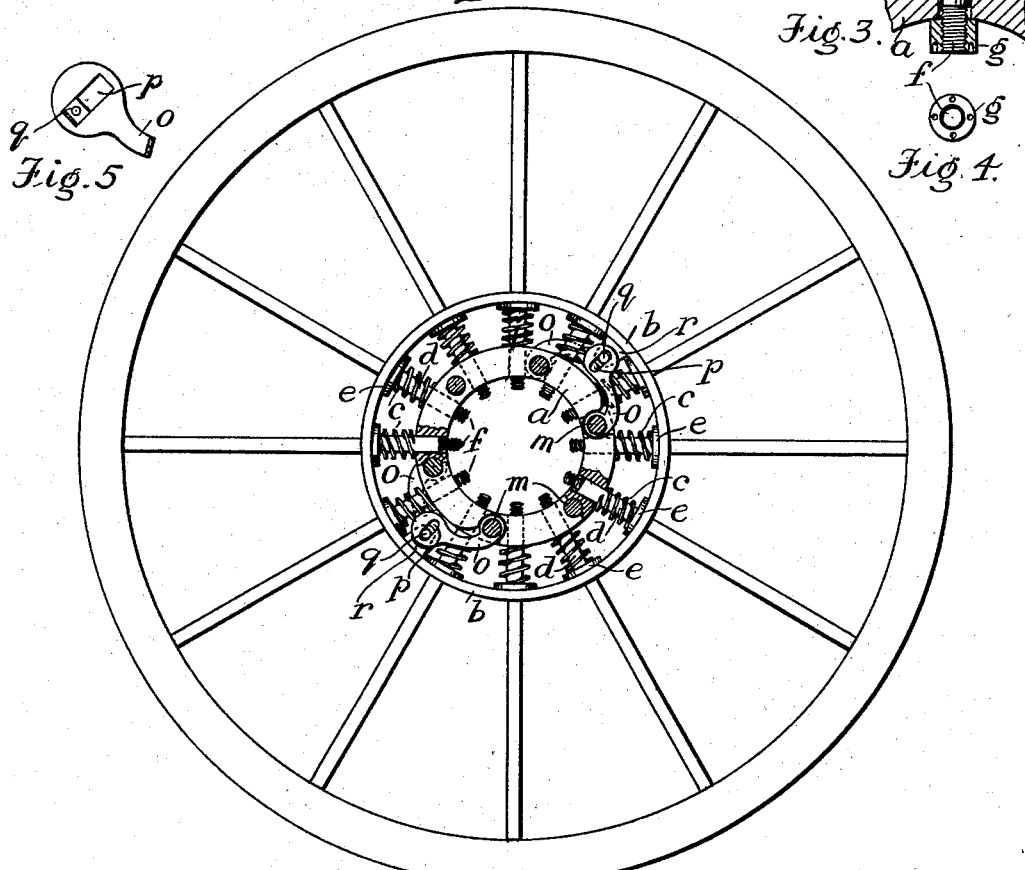
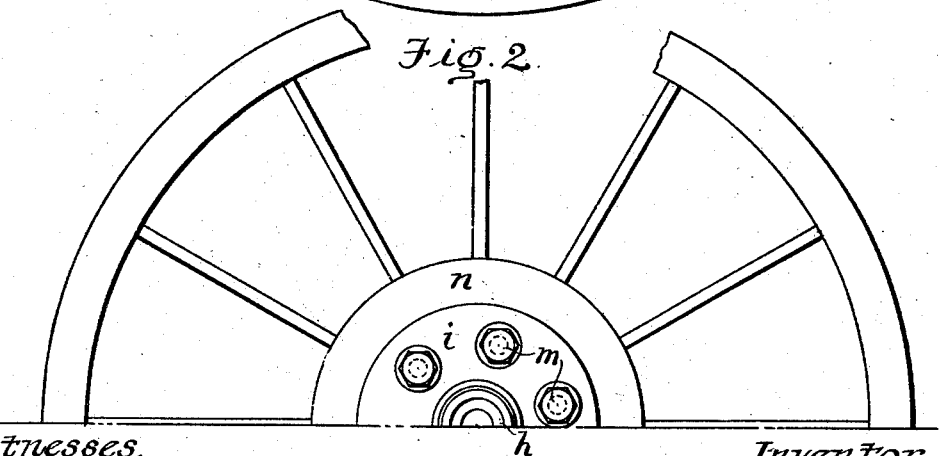
Witnesses.
Fred W. Englert
Geo. H. Byrne
Inventor:
J. Jackson.
Wilkinson & Fisher
Attorneys.

No. 743,289. PATENTED NOV. 3, 1903.
J. JACKSON.
SPRING WHEEL FOR VEHICLES.
APPLICATION FILED DEC. 8, 1902.
NO MODEL. 3 SHEETS—SHEET 2.
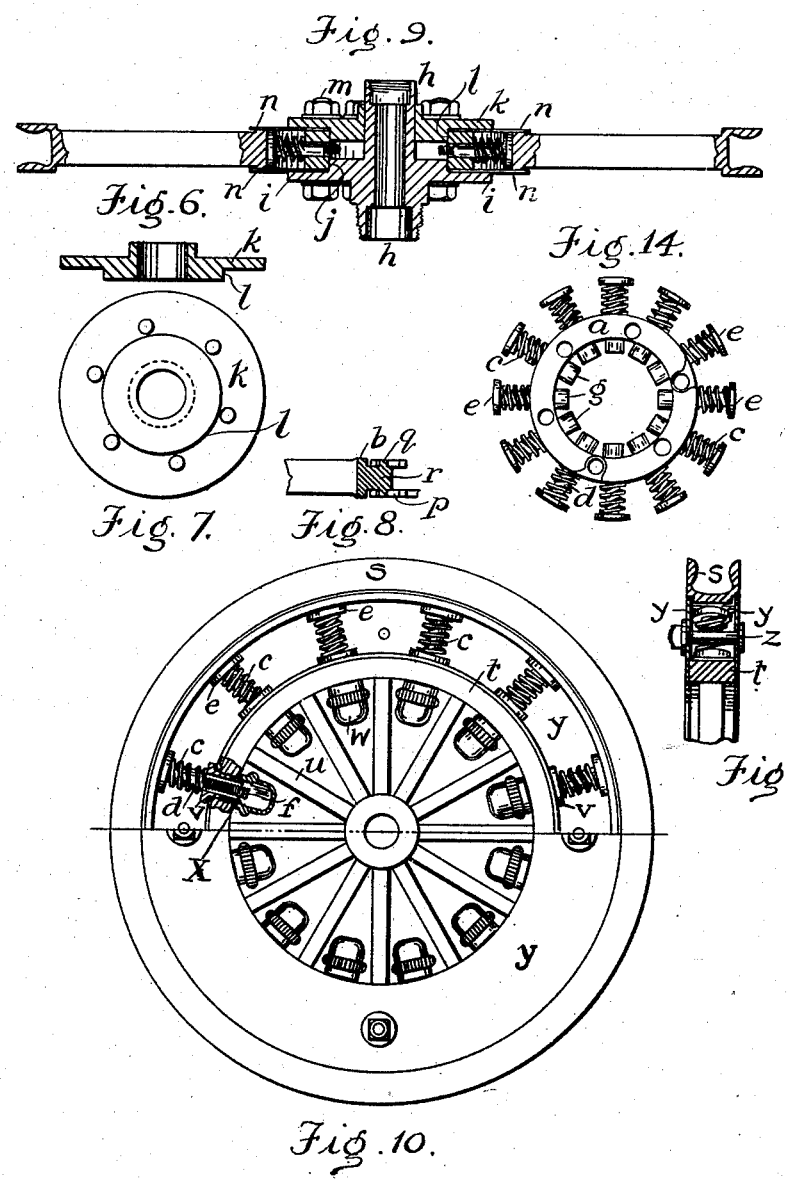
Witnesses
Fred W. Englert
Geo. H. Byrne
Inventor:
J. Jackson.
by Wilkinson & Fisher
Attorneys.

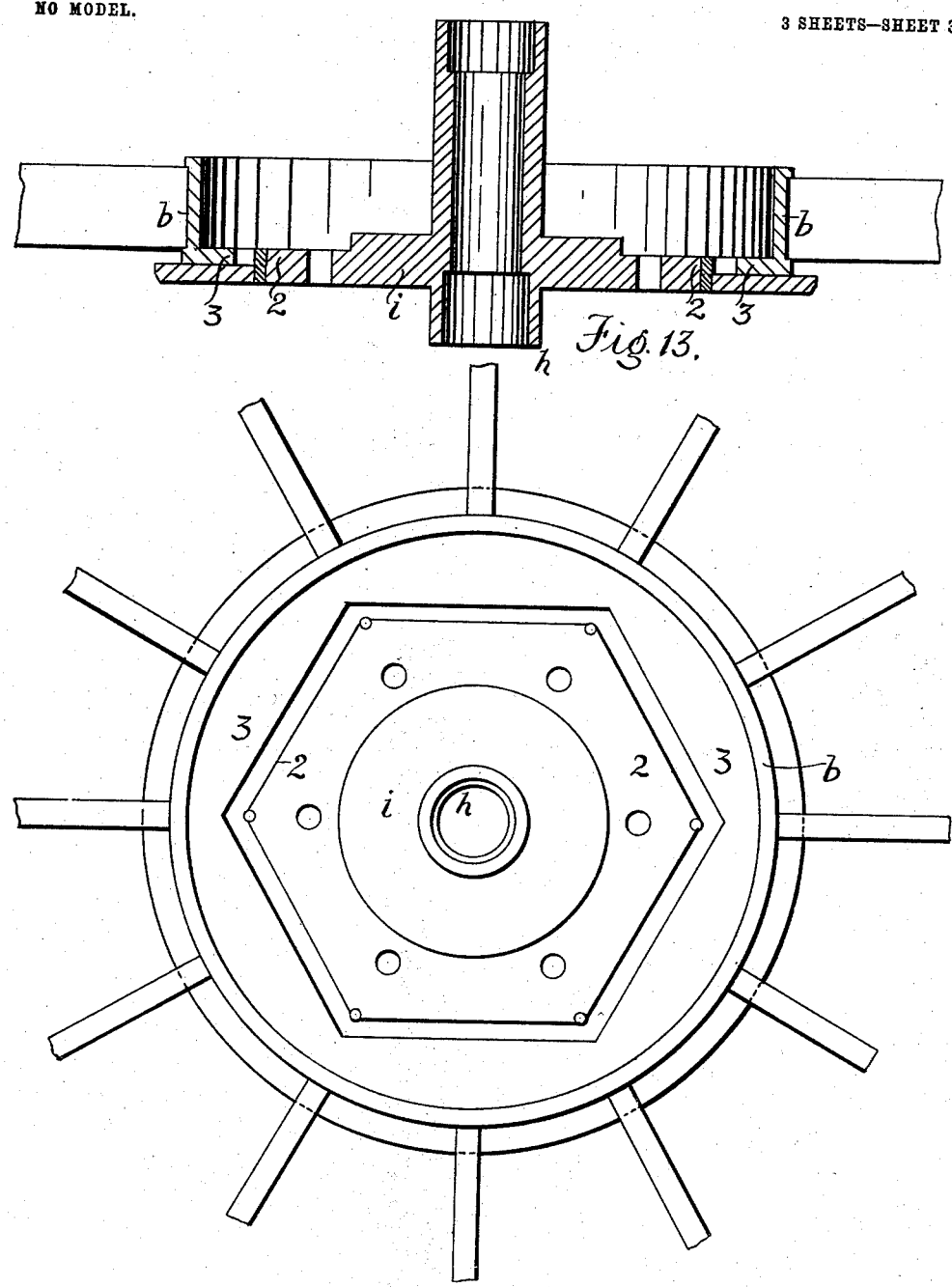

No. 743,289. Patented November 3, 1903.

UNITED STATES PATENT OFFICE.

JOHN JACKSON, OF LONDON, ENGLAND.

SPRING-WHEEL FOR VEHICLES.

SPECIFICATION forming part of Letters Patent No. 743,289, dated November 3, 1903.

Application filed December 8, 1902. Serial No. 134,394. (No model.)

*To all whom it may concern:*

Be it known that I, JOHN JACKSON, a subject of the King of England, residing at 232 St. John street, Clerkenwell, London, England, have invented certain new and useful Improvements in Spring-Wheels for Motor-Cars and other Vehicles; and I do hereby declare the following to be a full, clear, and exact description of the invention, such as will enable others skilled in the art to which it appertains to make and use the same.

This invention relates to wheels for motor-cars and other vehicles, and provides an elastic or resilient wheel which is capable of reducing vibration or jolting to a minimum.

The improved wheel comprises an inner ring adapted to be secured directly to the hub and an outer ring of larger diameter upon which the wheel proper is built. The said outer ring may be made of metal or of wood lined with metal.

In order that my said invention may be clearly understood, I will describe the same with reference to the drawings accompanying this specification, in which—

Figure 1 shows elevation of wheel with covering-disks removed. Fig. 2 shows elevation of wheel with disks in position. Figs. 3 to 8 show details of the wheel shown at Figs. 1 and 2, reference being hereinafter made to these details. Fig. 9 shows section through diameter of said wheel drawn to a smaller scale. Fig. 10 shows elevation of a modified form of wheel constructed according to this invention. The top half of this view shows the wheel with the covering-plate removed. Fig. 11 shows section of rim of wheel represented at Fig. 10. Fig. 12 shows a plan, and Fig. 13 a sectional view, of an alternative method of preventing rotation of the inner ring relatively to the outer ring. Fig. 14 shows the inner ring, with the springs, removed from the outer ring.

The same characters of reference denote the same parts in all the views.

Referring to Figs. 1 to 9, $a$ shows an inner ring, and $b$ an outer ring, upon which the wheel proper is built. In the annular space between the rings $a$ and $b$ are arranged a number of springs $c$ to transmit the load from the inner ring $a$ to the outer ring $b$. These springs $c$ act through radial buffers $d$, which are constructed to be pressed outwardly against the inner surface of the outer ring $b$ by the springs $c$, the latter being compressed between the heads $e$ of the buffers $d$ and the inner ring $a$. The buffer-heads $e$ are shaped to the same curvature as the inner cylindrical surface of the outer ring $b$, so that contact over the largest possible surface is insured between the heads $e$ and the ring $b$. Spiral springs $c$ are shown on the drawings; but I may employ laminated bow springs or springs of other suitable form, mounted and arranged in a suitable manner.

To effect the assembling and dismantling of the parts of the wheel, the shanks of the buffers $d$ are arranged to extend through holes in the inner ring $a$, and the inner ends $f$ of said shanks are screw-threaded. By means of nuts $g$, (shown to an enlarged scale at Figs. 3 and 4,) screwed on the projecting ends $f$ against the inner ring $a$, the buffer-heads $e$ can be withdrawn from contact with the outer ring $b$, whereupon the wheel can be readily removed from (see Fig. 14) and replaced on the ring $a$. When the parts of the wheel are assembled, the nuts $g$ are removed to allow the springs $c$ to act and press the buffer-heads $e$ against the outer ring $b$.

The hub $h$ of the wheel (see Figs. 2 and 9) is formed integrally with the disk $i$, which bears against the side of the inner ring $a$ and has a shoulder $j$ adapted to fit in the said ring. At the other side of the wheel is a similar but removable disk $k$, with a shoulder $l$. The disk $k$ is shown detached in section and in plan at Figs. 6 and 7, respectively. The hub $h$ is secured in the inner ring $a$ by bolts $m$, Figs. 2 and 9, passing through the disks $i$ and $k$ and the ring $a$. $n$ $n$ show two disks for covering the space occupied by the buffers $d$ and springs $c$ without interfering with the movements of the wheel relatively to the inner ring $a$. The space between the disks serves to hold lubricant.

To prevent creeping or rotation of the inner ring $a$ relatively to the outer ring $b$, I may provide a link or a plurality of links connecting said rings. Each link has a pin-and-slot connection at one end or in some cases at both ends to allow of the required radial movement of the wheel in respect to the inner ring; but in actual practice I preferably employ a plurality of links o—say four, as shown—connecting the two rings. Each link o embraces at its inner end one of the bolts m and is formed at its outer end with a slot p, (in any position,) in which a pin q, fixed on a lug r, formed on the ring b, engages. Fig. 8 shows section through one of these lugs r. Fig. 5 shows how this pin q may be formed with a flat instead of a round bearing-surface. The slot p allows of a slight movement of the ring a relatively to the ring b. It is obvious that other methods of preventing the said rotation may be adopted, one of which is hereinafter described.

I may provide a dust-proof cap to inclose the ring b.

Referring to Figs. 10 and 11, the springs c are shown placed between the rim s of the wheel and an inner rim t, the said inner rim being connected by the spokes u to the hub of the wheel. The buffers d and heads e are similar to those already described; but in this case sockets v are provided in the ring t, through which the screw ends f pass freely. Lubricating-caps w screw on the screwed projecting ends x of the sockets v. By removing the caps w nuts g may be screwed on the ends f, as before described, to withdraw the buffer-heads from contact with the inner surface of the ring. y y show annular disks covering the space between the rings s and t. z shows bolts holding the disks y y in place, but not interfering with the movement of the ring s relatively to the ring t. I may employ a device similar to that already described for preventing creeping.

In Figs. 12 and 13, which show an alternative method of preventing creeping or rotation of the outer ring with respect to the inner ring, 2 shows a hexagonal boss, formed on the inner side of the disk i, and 3 a flange on the ring b, said flange being cut away in hexagonal form, as shown. The angles of the hexagon 2 are preferably rounded, as shown at Fig. 12. The hexagon 2 can turn slightly in the flange 3; but such turning is limited on account of the rounded angles of the hexagon 2 coming into contact with the sides of the flange 3, and sufficient space is left for the play of the springs.

It is to be particularly observed that by the employment of the buffers controlled by screw-nuts I am enabled to employ springs normally under any amount of compression suitable to the load they are to carry. The result which I have found in practice is that the vehicle travels far more easily than if the springs were not normally in compression. The reason of this is that when the wheel passes over an obstacle, although the lower springs are compressed to a further extent, the upper springs cannot expand to their fullest possible extent, and the buffers e still remain in forced contact with the outer ring, thus preventing any possible jolting or bouncing such as has been invariably present in spring-wheels as hitherto constructed.

What I claim as my invention, and desire to secure by Letters Patent, is—

1. In a spring-wheel, the combination of a rigidly-supported inner ring, a non-resilient outer ring, spring connections between said inner and outer rings, interposed under high compression, a tread-surface member rigidly supported by said outer ring, and means for further compressing said spring connections for disconnecting said inner and outer rings.

2. In a spring-wheel, the combination of a rigidly-supported inner ring, a non-resilient outer ring, a tread-surface member carried by said outer ring, spring connections, interposed under high compression, between said inner and outer rings, and so supporting said outer ring as to permit of radial movement of said inner and outer rings relatively to each other, and means for further compressing said spring connections for disconnecting said inner and outer rings.

3. The combination with a spring-wheel, comprising a rigidly-supported inner ring, a non-resilient outer ring, and a tread member carried thereby, of means, whereby said rings may move radially and circumferentially relatively to each other, comprising buffers interposed between said rings and adapted to slidingly engage the inner surface of said outer ring, springs normally engaging said buffers and inner ring under a high degree of compression for making close frictional contact between said buffers and outer ring, means for limiting the independent circumferential movement of said rings, and means for further compressing said springs and disengaging said buffers and outer ring.

4. The combination with a spring-wheel comprising a rigidly-supported inner ring, a non-resilient outer ring, and a tread member carried thereby, of headed buffer-bars interposed between said rings screw-threaded at their shank end and adapted to pass through suitable apertures in said inner ring, springs normally engaging said buffer-bars and inner ring under high tension for holding the buffer-heads in close frictional contact with said outer ring, and nuts adapted to engage the screw-thread ends of said buffers for further compressing said springs and disengaging said inner and outer rings.

5. The combination with a spring-wheel comprising a rigidly-supported inner ring, a non-resilient outer ring, and a tread-surface member carried by said outer ring, of means so connecting said inner and outer rings as to allow of the radial and rotary movement of one relatively to the other, comprising buffer-bars provided at one end with rounded heads slidably engaging the inner surface of said outer ring and screw-threaded at their other end and adapted to pass through suitable apertures in said inner ring, springs normally engaging said buffer-bars and inner ring under high compression for the purposes set forth, means for limiting the independent rotary movement of said rings, and nuts adapted to engage the screw-thread ends of said buffer-bars for further compressing said springs and disengaging said inner and outer rings.

6. In a wheel, the combination with the hub proper and a pair of clamping-disks thereon, of an inner or hub ring encircling said hub proper and spaced therefrom and means for rigidly clamping said hub-ring in position between said disks, a spoke-ring of greater diameter than said hub-ring, springs under high compression so interposed between said hub and spoke rings as to firmly support said spoke-ring on said hub-ring but allow of the radial and circumferential movement of one ring relatively to the other, and means for limiting the independent rotary movement of said rings.

7. In a wheel, the combination with the hub proper provided at one end with a disk formed integrally therewith, and a second disk centrally apertured to fit said hub, of an inner or hub ring encircling said hub proper and spaced therefrom and means for rigidly clamping said hub-ring in position between said disks, a spoke-ring of greater diameter than said hub-ring, springs under high compression so interposed between said hub and spoke rings as to firmly support said spoke-ring on said hub-ring but allow of the radial and circumferential movement of one ring relatively to the other, and means for limiting the independent rotary movement of said rings.

8. In a wheel, the combination with the hub proper and a pair of perforated clamping-disks thereon, of an inner or hub ring encircling said hub proper and spaced therefrom and bolts passing through said apertured disks for rigidly clamping said hub-ring in position between the same, a spoke-ring of greater diameter than said hub-ring, springs under high compression so interposed between said hub and spoke rings as to firmly support said spoke-ring on said hub-ring but allow of the radial and circumferential movement of one ring relatively to the other, and means for limiting the independent rotary movement of said rings.

9. In a wheel the combination with the hub and a pair of clamping-disks thereon, said disks being provided with an annular recess on their inner surface, of a hub-ring adapted to seat in said annular recess, and means for rigidly clamping said hub-ring therein, a spoke-ring of greater diameter than said hub-ring, springs under high compression so interposed between said hub and spoke rings as to firmly support said spoke-ring on said hub-ring but allow of the radial and circumferential movement of one ring relatively to the other, and means for limiting the independent rotary movement of said rings.

10. In a wheel, the combination of a hub, an inner ring rigidly supported on said hub, an outer ring, a tread-surface member carried by said outer ring, means so connecting said inner and outer rings as to allow of the radial and rotary movement of one relatively to the other, and means for limiting the independent rotary movement of said rings, comprising a boss carried by and extending around said hub, and an inwardly-extending inclosing flange carried by said outer ring adapted to engage said boss for the purpose set forth.

11. In a wheel, the combination of a hub, an inner ring rigidly supported on said hub, an outer ring, a tread-surface member carried by said outer ring, means so connecting said inner and outer rings as to allow of the radial and rotary movement of one relatively to the other, and means for limiting the independent rotary movement of said rings, comprising a hexagonal boss carried by said hub, and an inwardly-extending flange carried by said outer ring cut away in hexagonal form and adapted to engage said boss.

12. In a wheel, the combination with the hub and a pair of clamping-disks thereon, of a hub-ring and means for rigidly clamping said hub-ring between said disks, a spoke-ring of greater diameter than said hub-ring, springs under high compression so interposed between said hub and spoke rings as to firmly support said spoke-ring on said hub-ring, but allow of the radial and rotary movement of one ring relatively to the other, and means for limiting the independent rotary movement of said rings, comprising a hexagonal boss, provided with reinforced rounded angles, carried by one of said disks, and an inwardly-extending flange carried by said spoke-ring, cut away in hexagonal form and adapted to engage said boss, substantially as described.

In testimony whereof I affix my signature in presence of two witnesses.

JOHN JACKSON.

Witnesses:
A. BROWNE,
A. E. VIDAL.